United States Patent [19]

Wolke et al.

[11] Patent Number: 5,104,669
[45] Date of Patent: Apr. 14, 1992

[54] MICROWAVEABLE FLOUR-STARCHED BASED FOOD PRODUCT

[76] Inventors: Mark Wolke, 1211 SW. 21st St., Pendleton, Oreg. 97801; Michael Zakin, 925 Springhill, Northbrook, Ill. 60062

[21] Appl. No.: 730,580

[22] Filed: Jul. 15, 1991

Related U.S. Application Data

[63] Continuation-in-part of Ser. No. 634,945, Dec. 28, 1990, abandoned, which is a continuation of Ser. No. 268,748, Nov. 8, 1988, abandoned.

[51] Int. Cl.$^5$ ............................................. A21D 10/00
[52] U.S. Cl. .................................... 426/94; 426/241; 426/549; 426/622
[58] Field of Search ............... 426/243, 391, 549, 622, 426/94, 241

[56] References Cited

U.S. PATENT DOCUMENTS 4,463,020  7/1984  Ottenberg et al. .................. 426/243
4,529,607  7/1985  Lenchin et al. ..................... 426/243
4,560,559  12/1985  Ottenberg et al. ................. 426/243

*Primary Examiner*—George Yeung
*Attorney, Agent, or Firm*—McAndrews, Held & Malloy, Ltd.

[57] ABSTRACT

The present invention is directed to a flour-starch mixture that is capable of being converted into a flour-starch based food product that heats evenly from a frozen condition, when exposed to microwave energy. Optionally, the flour-starch based food product of this present invention is combined with a microwave susceptor to obtain enhanced crisping on the outside.

The flour-starch based food product of the present invention is made from a flour-starch mixture comprising from about 85% to about 35% by weight flour, from about 15% to about 60% by weight high amylose starch, and from about 0.25% to about 5% by weight high amylopectin starch.

The flour-starch based food product of the present invention is particularly useful in preparing consumer oriented microwaveable food products, where features such as palatability, even heating and even crisping are desired.

29 Claims, No Drawings

MICROWAVEABLE FLOUR-STARCHED BASED FOOD PRODUCT

This application is a continuation in part of application Ser. No. 634,945, filed Dec. 28, 1990, now abandoned, which is a continuation of application Ser. No. 268,748, filed Nov. 8, 1988, and now abandoned.

BACKGROUND OF THE INVENTION

A. Field of the Invention

The present invention relates to a flour-starch mixture and to an improved microwaveable flour-starch based food product that is prepared therefrom. The flour-starch based food product of the present invention is capable of heating evenly, even from a frozen state, when exposed to microwave energy and resists the deterioration in palatability that accompanies microwave exposure. The present invention further relates to a flour-starch based food I0 product in combination with a microwave susceptor. The present invention is useful because it provides a palatable flour-starch based food product that is capable of heating and crisping evenly when exposed to microwave energy. The resultant flour-starch based food product also exhibits resistance to mold formation.

B. Prior Art

It has become commonplace for consumers to have microwave ovens at their disposal for home cooking. Microwave cooking is remarkably quick and convenient. Accordingly, both consumers and industry seek to use microwave ovens for everything from cooking vegetables and meats to reheating pizza, sandwiches, rolls, and other food products containing flour as an ingredient.

As noted in U.S. Pat. Nos. 4,463,020 and 4,560,559, the industry has long recognized and sought to solve problems that arise from microwaving flour-based products, especially those that are yeast-raised like bread rolls. Many flour-based products, such as pizza, breads, and pasta, become impalatable after short exposure to microwave energy. Bread, for example, develops a rubbery or gummy crust that is difficult to tear and chew after microwaving. In addition, the inside of the bread frequently becomes soggy or develops hard lumps. Cf. U.S. Pat. No. 4,463,020 at col. 1, ln. 32-42.

Sandwiches and other foods having flour-based components also tend to heat unevenly. As the above-referenced patents explain, the rate at which food products absorb microwave energy is dependent upon their moisture content. Sandwich rolls frequently have a high moisture content relative to the sandwich filling. When microwaved, the sandwich rolls tend to overheat before the filling reaches serving temperature. The result is a sandwich roll of reduced palatability.

The industry has tried a variety of ways to reduce these problems. They have met with limited success. One attempt involves use of "rich" formulations. These formulations are "rich" in expensive non-flour components (such as syrup, shortening, or egg) but are low in water content. Because of their low water content they tend to absorb microwave energy more slowly. The use of "rich" formulations adds cost to production. Finally, "rich" formulations have not eliminated the problem of a hardened crust and a soggy center that develops during microwaving. CF. Id. at col. 1, ln. 61 to col. 2, ln. 2.

Pre-toasting of the flour-based product has also been used to reduce water content. The use of day-old bread has similarly been tried. Although these methods provide for some improvement in palatability, neither of these methods has proven very satisfactory. Both methods still result in a flour-based food product having reduced palatability upon microwaving. Both methods also require the additional step of bread preparation which increases both cost and handling time.

U.S. Pat. No. 4,463,020 (Ottenberg I) discloses the use in combination of wheat flour, yeast and rice flour to produce a flour-based food product having a reduced deterioration in palatability when that food product is exposed to microwave energy. U.S. Pat. No. 4,560,559 (Ottenberg II) discloses that "the key to the effectiveness of the rice flour [in the '020 patent] is the rice starch of which it is composed and that certain other starches can be added. . ." ['559 at col. 2, ln. 36-40]. The Ottenberg II patent more specifically discloses the use in combination of "wheat flour, yeast and at least one starch having a sufficiently small crystal size . . .[i.e.,] an average crystal size of less than about 20 microns [to] improve the resistance of a yeast raised wheat-based food product to deterioration from microwave energy." ['559 at col. 2, ln. 53-60]. The Ottenberg formulations are alleged to improve the microwavability of wheat based food products "from either a refrigerated or room temperature state." ['559 at col. 8 ln. 62-63]. However, Ottenberg II teaches that "Frozen food products are generally not advantageously prepared by microwave cooking because the ice in the product resists microwave energy." ['559 at col. 8, ln. 67 to col. 9, ln. 1]. Regarding food products prepared according to his invention, Ottenberg specifically teaches that "Food products according to the invention that are frozen, should therefore be defrosted or thawed before being heated in a microwave oven." ['559 at col. 9, ln. 1-4]. Hence, the wheat flour yeast and starch compositions of Ottenberg are not satisfactory for providing a flour-based food product that is microwaveable directly from its frozen state.

An object of the present invention is to provide a food product that is microwaveable from its frozen state without a loss in palatability.

SUMMARY OF THE INVENTION

The present invention is directed to a flour-starch mixture that is an intermediate composition of matter for use in the preparation of a flour-starch based food product. The present invention also includes a flour-starch based food product that is made with the flour-starch mixture of the present invention. The flour-starch based food product of the present invention exhibits the unexpected property of heating evenly, even from its frozen state, when exposed to microwave energy but without loss of palatability. Flour-starch based food products of the present invention also exhibit a unexpected resistance to attack by molds.

In another embodiment, the present invention further includes a flour-based food product, such as waffles, pancakes, or toast, in its frozen state in combination with a microwave susceptor. During exposure to microwave energy, this combination provides the added feature of allowing the exterior dough of the flour-starch based product to crisp evenly while the interior dough remains moist.

In particular, the present invention is directed to a flourstarch mixture, suitable for use as a flour substitute, comprising from about 85% to 35% by weight flour, from about 15% to about 60% by weight high amylose starch, and from about 0.25% to about 5% by weight high amylopectin starch. Preferably, the flour-starch mixture of the present invention comprises from about 59% to about 47% by weight flour, from about 40% to about 50% by weight high amylose starch and from about 1% to about 3% by weight high amylopectin starch.

In addition, the present invention also encompasses a method for preparing the above mentioned flour-starch mixture which comprises the step of combining in any order from about 85% to about 35% by weight flour, from about 15% to about 60% by weight of high amylose starch, and from about 0.25% to about 5% of high amylopectin starch.

The flour-starch based food product of the present invention comprises a flour-starch mixture having from about 85 to about 35 parts by weight flour, from about 15 to about 60 parts by weight of high amylose starch, and from about 0.25 to about 5 parts by weight of high amylopectin starch.

In a further aspect, the present invention also encompasses a method for preparing a flour-starch based product that retains palatability when subjected to microwave energy. The method includes the steps of:
  a) converting a flour-starch mixture into a dough, said flour-starch mixture comprising from about 85% to about 35% by weight flour, from about 15% to about 60% by weight of high amylose starch and from about 0.25% to about 5% by weight of a high amylopectin starch; and
  b) cooking said dough to form a flour-starch based food product.

Optionally, the method can further include after step (b) the step of:
  c) freezing said flour-starch based food product to provide a frozen flour-starch based food product that is capable of heating substantially evenly when subjected to microwave energy.

As a further option, the frozen flour-starch based food product may be associated with a microwave susceptor any time prior to microwaving. Frozen flour-starch based food products that are preferably associated with a microwave susceptor include waffles, toast and pancakes. When such frozen products are associated with a susceptor and subjected to microwave energy, the dough on the outside becomes crisp while the dough o the inside stays moist.

DETAILED DESCRIPTION OF THE INVENTION

The present invention has several aspects. In its first aspect, the present invention is directed to a flour-starch mixture comprising from about 85% to about 35% by weight flour, from about 15% to about 60% by weight of high amylose starch, and from about 0.25% to about 5% by weight of high amylopectin starch.

All flour and starches have some moisture content. However, for simplicity in describing the present invention, the moisture content in the flour and starches is not considered. Instead, the various percentages of flour, high amylose starch and high amylopectin starch are expressed in terms of percent dry weight. For example, a starch having 10% moisture by weight, 45% high amylose starch by weight and 45% high amylopectin starch by weight, is expressed in terms of the present invention as being composed of 50% by weight of high amylose starch and 50% by weight of high amylopectin starch wherein the phrase "by weight" means "by dry weight," even if the dry weight is only a theoretical weight.

The term "flour" as used in the present invention means any flour, either alone or a mixture, such as derived from wheat, rye, corn, rice, etc. that is appropriate for the flour-starch based food product being produced (e.g., pizza crust, bread, cake, croissant, crescent roll, bagel, toast, waffle, pancake etc.).

By the term "high amylose starch" as used herein is meant a single starch or a mixture of starches wherein greater than about 40% by weight of the starch content is amylose. Although most starches have about 25% amylose and about 75% amylopectin, a high amylose starch is commercially available under the tradename "Crisp Film," from National Starch, Chicago, Ill. "Crisp Film" is a modified high amylose cornstarch that is a white to off-white powder, having a pH of 6.0, a moisture content of approximately 11%, an average crystal size of about 25-35 microns, and in terms of starch is comprised of 50% amylose and 50% amylopectin by weight. Another commercially available high amylose starch, Crisp Tex, (American Maize Products, Hammond, Indiana) is also suitable for use in the present invention.

By the term "high amylopectin starch" as used herein is meant a single starch or a mixture of starches wherein the starch content is greater than about 80% by weight amylopectin. Suitable high amylopectin starches include the "waxy" starches, such as waxy corn starch, waxy maize starch, and the modified the waxy corn or maize starches. A preferred high amylopectin starch is the modified waxy maize starch that is commercially available under the tradename "Colflo ®67" from National Starch, Chicago, Ill. "Colflo ®67" is a white to off-white powder, having a pH of approximately 6, a moisture content of about 11%, an average crystal size of about 25-35 microns, and that in terms of starch is comprised of 90-100% amylopectin by weight.

In a preferred embodiment, the flour-starch mixture of the present invention comprises from about 59% to about 47% by weight flour, from about 40% to about 50% by weight of high amylose starch, and from about 1% to about 3% by weight of high amylopectin starch.

In a particularly, preferred embodiment, the flour-starch mixture of the present invention comprises about 53% by weight flour, about 45% by weight high amylose starch, and about 2% by weight high amylopectin starch. It is especially preferred that the high amylopectin starch be "Colflo ®67."

The two components in a high amylose starch are amylose and amylopectin. These are the same two components that are present in a high amylopectin starch, albeit in substantially different proportions. Hence, when a high amylose starch and a high amylopectin starch are combined, there is achieved a particular ratio of amylose to amylopectin. In this invention, the ratio of amylose to amylopectin, based upon our combination of a high amylose starch and a high amylopectin starch, is calculated to range from about 0.58:1 to about 0.9:1.

To the best of our knowledge, a single starch having the ratio of amylose to amylopectin that is used in the present invention does not naturally occur in a single species of plant or organism. However, we have no reason to believe that a single starch with a ratio of amylose to amylopectin between about 0.58:1 and about 0.9:1 would not also work. Such a single starch may be naturally found. However, it would more likely be the result of the genetic modification of an existing source of starch. The genetic modification of plants to cause them to produce starches having modified amylose to amylopectin ratios is already known in the art. For example, the commercially available starch, "Col-flo ®67," is said to be the product of just such genetic modification.

Thus, when expressed in terms of its amylose to amylopectin ratio, the flour-starch mixture of the present invention comprises from about 85% to about 35% by weight flour and from about 15% to about 65% by weight starch wherein the ratio of amylose to amylopectin in said starch is from about 0.58:1 to about 0.9:1.

In its second aspect, the present invention is also directed to a method for preparing the flour-starch mixture comprising the step of:

(a) combining in any order from about 85 to about 35 parts by weight flour, from about 15 to about 60 parts by weight of high amylose starch, and from about 0.25 to about 5 parts by weight of high amylopectin starch, whereby there is formed a flour-starch mixture useful in the preparation of a flour-starch based food product.

Preferably, the method for preparing the flour-starch mixture comprises the step of:

(a) combining in any order from about 59 to about 47 parts by weight flour, from about 40 to about 50 parts by weight high amylose starch and from about 1 to about 3 parts by weight high amylopectin starch.

More preferably, the above method comprises:

(a) combining in any order about 53 parts by weight flour, about 45 parts by weight high amylose starch and about 2 parts by weight of a high amylopectin starch.

The starches and flour may be combined with mixing or without mixing. Alternatively, the two starches may be pre-combined to form a starch concentrate that is then added to the appropriate amount of flour. Regardless of how it is mixed, the flour-starch mixture of the present invention is an intermediate composition of matter that is used to prepare the flour-starch based food product of the present invention. Thus, whereas flour is an intermediate compound in the production of conventional flour based food products, the flour-starch mixture of the present invention is an intermediate in the production of the flour-starch based food products of the present invention.

In its third aspect, the present invention is directed to a flour-starch based food product that is prepared from the flourstarch mixture of the present invention. The flour-starch based food product of the present invention exhibits several unexpected properties including retention of moisture after conventional cooking; even heating and retention of exterior crispness and interior tenderness when the frozen product is exposed to microwave energy; and resistance to attack by molds. These properties are highly desirable in the flour-starch based food product since they allow the flour-starch based food product to be fresh frozen and then reheated by exposure to microwave energy without loss of crispness on the outside or tenderness on the inside. Further, they provide increased shelf life for the flour-starch based food product of the present invention relative to the analogous product produced from an all flour base.

In certain flour-starch based food products of the present invention, such as waffles, pancakes, or toast, the property of even crisping is enhanced by placing the product on a susceptor during its exposure to microwave energy.

The property of even heating is exemplified by comparing the data in Tables 1 and 2. Table 1 reflects the heating that occurs during exposure to microwave energy in a frozen pre-cooked prior art type croissant that was made with ordinary croissant flour. The temperature in degrees Fahrenheit (° F.) was measured at two points on the croissant, via probes placed at the croissant's center and its side, using a Luxtron brand fluoroptic thermometry system for microwave food testing. The frozen prior art type (i.e., all flour based) croissant of Table 1 was exposed to microwave energy for thirty seconds. The temperature of the dough at the two probes was recorded at two second intervals ("OBS") beginning at time 0 through time =34 seconds. According to Table 1, after thirty seconds of exposure to microwave energy, the temperature of the dough of the prior art type croissant was 134.4 degrees ("Fahrenheit" hereinafter being understood). In contrast, the temperature of the dough at the side of the same croissant after the same thirty seconds of exposure was 202.1 degrees, i.e., more than 67 degrees higher. Such uneven heating that results in cool spots and/or hot spots in this croissant, or any food product for that matter, is undesirable. The hot spots tend to be tough and/or chewy. The cool spots are often wet and doughy by comparison.

Table 2 reflects the heating that occurred in a frozen flourstarch based croissant of the present invention during its exposure to microwave energy. The croissant of Table 2 had been prepared as described in Exhibit 1, utilizing the flour-starch mixture of the present invention, and then was subsequently frozen. As in Table 1, the croissant of Table 2 had its temperature measured in degrees Fahrenheit at two points on the croissant, via probes placed at the croissant's center and at its side, using a Luxtron brand fluoroptic thermometry system. In Table 2, the croissant was exposed to microwave energy for 25 seconds. The temperature of the croissant was measured at two second intervals during and after exposure. After 25 seconds of microwave exposure, the croissant's temperature, as measured at the croissant's center and side, was 207.2 degrees and 202.9 degrees respectively. (This temperature is the calculated average between the temperatures actually measured at 24 seconds and 26 seconds respectively). The resultant temperature difference between the side and the center of the flour-starch based croissant was only 4.3 degrees. In contrast, after about 25 seconds of microwave exposure, the temperature difference in the prior art all flour based croissant was substantially greater, i.e., 69.2 degrees and 78.0 degrees after 24 and 26 seconds respectively.

Table 2 also reflects that within about 4-5 seconds after the croissant ceased being exposed to microwave energy (i.e., at about time =30 seconds), the small temperature difference between the center and the side of the croissant had substantially equilibrated. In contrast, at about 4 seconds after the prior art type croissant ceased being exposed to microwave energy (i.e., at Time =34 seconds in Table 1), the temperature difference between its center and its side was 57.2 degrees. Thus, the data and observations reported in Tables 1 and 2 establish that a flourstarch based food product of the present invention, as exemplified by the frozen and pre-cooked croissants, heats evenly when exposed to microwave energy.

Tables 3 and 4 respectively reflect the heating and the crisping that occurred in a pre-cooked and subsequently frozen waffle that had been prepared according to Example 2 utilizing the flour-starch mixture of the present invention. The pre-cooked and frozen waffle of Table 3, which is a flour-starch based food product of the present invention, had two temperature probes, namely Probe No. 1 and Probe No. 2, that were horizontally centered at its opposite ends. The temperature of the waffle during exposure to microwave energy was measured, via the probes, at two second intervals beginning with time =0 using a Luxtron brand fluoroptic thermometry system. According to Table 3, after the waffle had been exposed to microwave energy for thirty seconds, the temperature of the waffle at Probes No. 1 and No. 2 was observed to be substantially equal, i.e., 169.0 and 175.8 degrees respectively. This is a difference of only 6.8 degrees. This substantially even heating is the same unexpected result as was found for the croissant of Table 2.

A second observation, "crispness," was also made on the waffle of Table 3. After thirty seconds of exposure to microwave energy, the waffle of Table 3 was very tender both inside and outside. While tenderness is the preferred property for the inside of a waffle, it is not the preferred property for the outside of the waffle.

Table 4 reflects both the heating and the "crispness" that wa observed when a frozen pre-cooked croissant, identical to the croissant in Table 3, was placed upon a microwave susceptor and then subjected to microwave energy. A microwave "susceptor" (or "susceptor board") is a substance capable of absorbing microwave energy and heating in response to such absorption.[1] A typical "susceptor" is a high melting point plastic, such as PET, onto which a metal, such as aluminum is deposited. Suitable microwave susceptors are commercially available from James River Corp., Portland, Ore.

[1] It would not be unusual for the "susceptor" itself to heat to over 400° F. upon exposure to microwave energy.

The waffle of Table 4, like the waffle of Table 3, had its two temperature probes horizontally centered at opposite ends. The waffle-susceptor combination was exposed to microwave energy for thirty seconds. Thereafter, the waffle was flipped over on the susceptor, and the waffle-susceptor combination was again exposed to microwave energy for thirty seconds. During the exposures to microwave energy and subsequent thereto, the temperature of the waffle was observed and recorded via the probes on a Luxtron brand fluoroptic thermometry system Combining the susceptor with the waffle caused the waffle to heat somewhat unevenly. However, this difference was compensated for by flipping the waffle. After sixty seconds of exposure to microwave energy, the interior of the waffle was uniformly moist and tender with no tough or soggy spots. More unexpectedly, combining the susceptor with the waffle caused the exterior of the waffle to be uniformly crisp, without adversely affecting the waffle's interior which became uniformly tender.

Thus, in another aspect, the present invention also encompasses a method for preparing a flour-starch based food product comprising the steps of:
(a) converting a flour-starch mixture into a dough, said flour starch mixture comprising from about 85% to about 35% by weight flour, from about 15% to about 60% by weight high amylose starch and from about 0.25% to about 5% by weight of high amylopectin starch; and
(b) cooking said dough to form a flour-starch based food product.

In a further step, the flour-starch based food product of the present invention may be frozen to form a frozen flour-starch based food product that is capable of heating substantially evenly when placed in a microwave oven and subjected to microwave energy. To obtain enhanced crisping on the outside, the flour-starch based food product of the present invention is optionally combined with a microwave susceptor. Preferably, the flour-starch based food product of the product susceptor combination is in a frozen state when placed into the microwave. Freezing may occur prior to or after association with the microwave susceptor. Although exterior crispness of a food product is a matter of taste, the flour-starch based food products of the present invention that are typically associated with a susceptor include, waffles, pancakes and toast. As a general rule, flour-starch based food products of the present invention, such as a bagel, a bread or a croissant, do not require enhanced crisping and are not typically associated with a susceptor during microwaving.

TABLE 1

Heating Observed In A Prior Art Croisant During Exposure to Microwave Energy For 30 Seconds

| OBS No. | Center Probe (°F.) | Side Probe (°F.) | Time (sec) |
|---|---|---|---|
| 1 | 7.2 | 8.7 | 0 |
| 2 | 7.0 | 8.4 | 2 |
| 3 | 11.9 | 9.7 | 4 |
| 4 | 18.7 | 15.9 | 6 |
| 5 | 25.2 | 23.9 | 8 |
| 6 | 31.0 | 31.6 | 10 |
| 7 | 36.6 | 41.6 | 12 |
| 8 | 43.4 | 56.5 | 14 |
| 9 | 52.6 | 74.9 | 16 |
| 10 | 62.7 | 95.6 | 18 |
| 11 | 74.4 | 120.8 | 20 |
| 12 | 86.3 | 144.8 | 22 |
| 13 | 100.2 | 169.4 | 24 |
| 14 | 117.0 | 195.0 | 26 |
| 15 | 128.7 | 202.9 | 28 |
| 16 | 134.4 | 202.1 | 30 |
| 17 | 138.5 | 201.0 | 32 |
| 18 | 141.9 | 199.1 | 34 |

TABLE 2

Heating Observed In A Croissant Made With The Flour-Starch Mixture During Exposure Of The Present Invention When Exposed to Microwave Energy For 25 Seconds

| OBS No. | Side Probe (°F.) | Center Probe (°F.) | Time (sec) |
|---|---|---|---|
| 1 | 18.0 | 22.2 | 0 |
| 2 | 81.4 | 22.2 | 2 |
| 3 | 21.2 | 24.9 | 4 |
| 4 | 29.3 | 38.4 | 6 |
| 5 | 39.0 | 62.1 | 8 |
| 6 | 52.1 | 94.6 | 10 |
| 7 | 68.6 | 126.0 | 12 |
| 8 | 90.0 | 156.8 | 14 |
| 9 | 112.6 | 180.5 | 16 |
| 10 | 137.7 | 201.9 | 18 |
| 11 | 163.5 | 207.0 | 20 |
| 12 | 185.6 | 206.8 | 22 |
| 13 | 200.3 | 207.2 | 24 |
| 14 | 205.6 | 207.2 | 26 |
| 15 | 205.9 | 206.3 | 28 |
| 16 | 204.9 | 204.2 | 30 |
| 17 | 204.8 | 203.8 | 32 |

TABLE 3

Heating And Crisping[a] Of A Waffle[b] Without A
Susceptor During A 30 Second Exposure To Microwave Energy

| OBS No. | Probe #1[c] (°F.) | Probe #2 (°F.) | Time (sec) |
|---|---|---|---|
| 1 | 18.4 | 18.5 | 0 |
| 2 | 18.5 | 18.5 | 2 |
| 3 | 23.8 | 25.8 | 4 |
| 4 | 34.4 | 39.1 | 6 |
| 5 | 45.9 | 53.1 | 8 |
| 6 | 59.2 | 67.6 | 10 |
| 7 | 72.0 | 81.2 | 12 |
| 8 | 84.6 | 94.2 | 14 |
| 9 | 95.5 | 105.7 | 16 |
| 10 | 107.1 | 116.2 | 18 |
| 11 | 118.1 | 128.0 | 20 |
| 12 | 129.2 | 138.4 | 22 |
| 13 | 139.8 | 148.5 | 24 |
| 14 | 149.6 | 157.5 | 26 |
| 15 | 159.5 | 167.0 | 28 |
| 16 | 169.0 | 175.8 | 30 |
| 17 | 177.7 | 184.1 | 32 |
| 18 | 179.2 | 181.8 | 34 |
| 19 | 179.4 | 179.4 | 36 |
| 20 | 179.4 | 177.4 | 38 |
| 21 | 178.7 | 175.1 | 40 |

[a]After microwave exposure, the product was very tender.
[b]The waffle was made with a flour-starch mixture of the present invention.
[c]Probes 1 and 2 were horizontally centered.

TABLE 4

Heating And Crisping[a] Of A Waffle[b] With A
Susceptor During A 60 Second Exposure[c] To Microwave Energy

| OBS No. | Probe #1[d] (°F.) | Probe #2 (°F.) | Time (sec) |
|---|---|---|---|
| 1 | 17.6 | 17.6 | 0 |
| 2 | 17.6 | 18.0 | 2 |
| 3 | 20.3 | 18.6 | 4 |
| 4 | 25.5 | 20.3 | 6 |
| 5 | 32.1 | 25.1 | 8 |
| 6 | 42.0 | 34.4 | 10 |
| 7 | 52.2 | 44.8 | 12 |
| 8 | 62.5 | 59.1 | 14 |
| 9 | 73.0 | 75.3 | 16 |
| 10 | 83.9 | 90.5 | 18 |
| 11 | 94.1 | 104.7 | 20 |
| 12 | 104.7 | 119.4 | 22 |
| 13 | 114.1 | 134.3 | 24 |
| 14 | 124.1 | 150.7 | 26 |
| 15 | 134.2 | 169.4 | 28 |
| 16 | 144.4 | 191.8 | 30 |
| 17 | 152.2 | 196.8 | 32 |
| 18 | 153.2 | 193.3 | 34 |
| 19 | 153.5 | 191.7 | 36 |
| 20 | 153.9 | 191.2 | 38 |
| 21 | 154.7 | 191.4 | 40 |
| 22 | 155.3 | 190.8 | 42 |
| 23 | 160.0 | 195.5 | 44 |
| 24 | 171.0 | 205.1 | 46 |
| 25 | 182.6 | 206.8 | 48 |
| 26 | 200.0 | 208.6 | 50 |
| 27 | 206.7 | 208.8 | 52 |
| 28 | 207.4 | 209.1 | 54 |
| 29 | 207.6 | 208.7 | 56 |
| 30 | 207.6 | 208.9 | 58 |
| 31 | 207.9 | 208.9 | 60 |
| 32 | 208.0 | 209.0 | 62 |
| 33 | 208.3 | 209.3 | 64 |
| 34 | 208.9 | 209.7 | 66 |
| 35 | 209.1 | 210.0 | 68 |
| 36 | 209.5 | 210.2 | 70 |
| 37 | 309.5 | 210.0 | 72 |

[a]Product was crisp yet tender.
[b]The waffle, which is the same formulation as in Table 3, was made with a flour-starch mixture of the present invention.
[c]The waffle was heated 30 seconds, flipped, then heated an additional thirty seconds.
[d]Probes 1 and 2 were horizontally centered.

The flour-starch based food product of the present invention also possesses the unexpected property of being capable of being repeatedly frozen and microwaved up to five times without loss of palatability. This property was observed when the flour-starch mixture of the present invention was substituted for conventional flour in a recipe for pizza crust (Example 3), a recipe for crescent rolls (Example 4), and a recipe for French Bread (Example 5). In each of the above recipes, the resulting food product, when frozen, displayed less water (or fluid) crystallization than did the corresponding product that was made with the traditional allflour recipe.

Although it is not known, it is believed that this lessening of fluid crystallization may have helped to reduce the deterioration in palatability of the pizza, the crescent rolls, and the French Bread that were made with the flour-starch mixture of the present invention. The applicants also believe that (i) the extremely high amylopectin modified waxy maize starch provides fluid stability in the flour-starch mixture when frozen, and (ii) the high amylose corn starch provides fluid stability during microwaving. Whatever the sources of stability, the resultant flour-starch based food product of the present invention possesses a dough, which when frozen and later microwaved, prevents the development excessively tough crusts and soggy or lumpy centers. In contrast, substituting the flour-starch mixture of the present invention for the flour (1:1) in the conventional recipe produced a flour-based food product (of the present invention) that exhibited 43.1% by weight of retained moisture.

When the flour that is utilized in a conventional recipe is substituted with the flour-starch mixture of the present invention, the resultant flour-starch based food product has a substantially greater moisture content than the all flour-based food product of the prior art. For example, when a fresh commercially available English muffin of the all flour type was compared to an English muffin that was prepared with the flour-starch mixture of the present invention, the resultant flour-starch based English muffin was determined to have a moisture content of about 43.1% by weight, whereas the all flour based English muffin of the prior art was determined to have the lesser moisture content of about 37.1% by weight. Hence, the flour-starch based English muffin of the present invention contained about 6% by weight more moisture or was 16% more moist than analogous English muffin of the prior art.

Notwithstanding its greater moisture content, the flourstarch based food product of the present invention exhibits unexpected resistance to attack by molds. For example, both a prior art type flour based English muffin and a flour-starch based English muffin of the present invention were prepared at the same time from substantially the same recipe. The difference in the recipes was a 1:1 substitution of the flour with the flour-starch mixture of the present invention. Both muffins were then frozen in the same freezer. Thereafter, both muffins were removed and then placed in separate clear plastic bags that were sealed. After nine days, the flour based English muffin began to show signs of mold development. After twenty days, the flour based English muffin was completely engulfed in mold. In contrast, the flour-starch based English muffin did not exhibit an mold growth after thirty-six days.

The flour starch mixture of the present invention can be made on-site immediately prior to use. However, if the flour-starch mixture is pre-mixed and shipped in non-bag quantities, i.e., in bulk or by rail car, separation of the flour from the starch occurs due to their respective density differences and the vibration imposed during shipping. In the present invention, a homogeneous flour-starch mixture that resists separation during shipping is made as follows:

1. for 12-15 minutes mix in a dry blend machine in any combination 55 pounds of the determined type of flour with 5 pounds of Colflo®67 and 40 pounds of Crisp Film, yielding 100 pounds of a flour-starch mixture;
2. add 50 pounds of the flour-starch mixture with 20 pounds of water, pounds of yeast, and ¼ pounds of salt in a dough mixer and mix this dough mixture in the dough mixer for 8-12 minutes at medium speed at 72-78 degrees Fahrenheit;
3. allow the dough to rise for an hour at 75-95 degrees Fahrenheit;
4. after it has risen, chop the dough in a dough cutter machine;
5. mix the remaining 50 pounds of the flourstarch mixture with the chopped dough in the dough cutter machine for 10 minutes; and
6. add the total mixture to a hammermill and hammer it for 10 minutes.

This last step heats the dough to about 178-188 degrees Fahrenheit, reduces the moisture content, kills the yeast, and yields a substantially homogeneous flour-starch mixture that resists separation during the bulk shipping. The above procedure is capable of being scaled up or down as needed.

When the flour-starch mixture of the present invention is made by the above multi-step process, the mixture behaves comparably to a flour-starch mixture that was prepared in Step 1 alone, but which had a higher percentage of starch. Stated otherwise, a flour-starch mixture that has been prepared by the above six step process is capable of employing higher percentages of flour to starch relative to a flour-starch mixture prepared by Step 1 alone when applied to a particular utility, e.g., croissants.

EXAMPLE 1

Croissant Recipe Employing A Flour-Starch Mixture Of The Present Invention

The croissant of Table 2, which employed the flour-starch mixture of the present invention, was prepared substantially according to the recipe described in the book "The Perfect Croissant," by Dee Coutelle, Contemporary Books, Chicago, Ill., 1983.

In particular, the ingredients for proofing the yeast included the following:
- 9 tablespoons of warm (100 degrees Fahrenheit) water;
- 3 packs of active dry yeast;
- 6 teaspoons of sugar; and
- 3 teaspoons of the flour-starch mixture of the present invention.

In proofing, the water was placed in a container and its temperature checked to assure that it was around 100 degrees Fahrenheit (hereinafter "degrees"). The packs of yeast were sprinkled over the water. Then, the sugar and flour-starch mixture were stirred in. The mixture was allowed to stand 5-8 minutes. The yeast was active as evidenced by the mixture's foaming.

Thereafter, the following remaining dough ingredients were combined as described in "the Perfect Croissant:"

- 1½ lbs. of the flour-starch mixture of the present invention;
- 6 tablespoons of sugar dissolved in 18 oz. of warm 100 degrees) milk;
- ½ teaspoon of salt;
- 3 teaspoons of peanut oil; and
- 2 sticks of cold unsalted butter.

However, in the above formulations, the flour-starch mixture was composed of the following ingredients:
- 65% bread flour;
- 33% "Crisp Film" (a high amylose starch); and
- 2% "Colflo®67" (a high amylopectin starch).

Although croissants that are made in the home would preferably use an all-purpose unbleached wheat flour, which has a lower gelatin or elasticity content, the croissant dough described above uses bread flour with its high gluten or elasticity content. This latter dough that is made with bread flour is especially suited to commercial applications wherein the dough is handled and rolled by automated equipment.

EXAMPLE 2

Waffle Recipe Employing A Flour-Starch Mixture Of The Present Invention

Water (158g) and egg whites (35g) were mixed for two minutes until foaming. Soya oil was added until it beaded, i.e. 35g. To the mixture was then added 86.7g of a waffle base mix and 163g of a flour-starch mixture of the present invention. The entire mixture was then mixed for 3½ minutes. The resulting waffle batter was poured into a waffle mold and cooked into a waffle in the conventional manner.

In the above formulation, the flour-starch mixture of the present invention was composed of 49.5% by weight pancake flour, 49.5% by weight of the high amylose starch "Crisp Film," and 1% by weight of the high amylopectin starch "Colflo®67."

EXAMPLE 3

Pizza

A traditional recipe for a pizza is set forth in the book "Light Style," authored by one of the present inventors, Wolke, and published by Harper & Rowe. In the recipe and the others that follow herein, the mentioned temperatures are in degrees Fahrenheit (° F.), hereinafter "degrees." The recipe is as follows:
- 1 envelope active dry yeast;
- ¼ cup lukewarm water (105 degrees);
- ½ teaspoon fructose;
- 2 cups sifted unbleached flour;
- 1½ teaspoons vegetable oil or olive oil;
- 1 tablespoon yellow cornmeal;
- 1 cup Italian Meat Sauce (p. 192);
- ¾ cup shredded mozzarella cheese;
- ½ cup sliced mushrooms;
- ½ onion, sliced in rings;
- ½ green bell pepper, sliced in rings;
- ½ red bell pepper, sliced in rings; and
- 1½ tablespoons grated parmesan cheese.

Dissolve yeast in lukewarm water. Add fructose and let yeast mixture stand ten minutes. Measure flour into a mixing bowl. Add yeast mixture and stir in thoroughly. On a lightly floured board, knead about 5 minutes, or until soft and pliable. Form the dough into ball and place in a lightly greased bowl. Turn ball to crease top, cover bowl, and let rise in a warm place about two hours, or until doubled in bulk.

Grease a 14-inch pizza pan or 11×17 inch baking sheet with ½ teaspoon of the oil. Sprinkle the pan evenly with cornmeal. Punch down the dough and roll out on a lightly floured board into a 14 inch circle to fit pizza pan or a rectangle to fit baking sheet. Place the dough in pan and pat and stretch it to fit the pan, pinching up a rim around the edges. Pierce the dough in several places with a fork. Spread Italian Meat Sauce over the pizza crust and let it rest about 10 minutes (at this point, the pizza may be frozen for up to one week; thaw before proceeding with recipe.) Cover the crust with a layer of mozzarella cheese. Arrange mushrooms, onions, and green and red peppers over cheese. Brush vegetables with remaining teaspoon of oil. Sprinkle with Parmesan cheese. Bake at 450 degrees about 25 minutes, or until browned. Serve at once.

When used in this traditional recipe for a pizza, the flourstarch mixture was substituted pound for pound as the flour component in the pizza crust recipe. The pizza was then baked as set forth above and frozen. The frozen pizza was then microwaved at the maximum intensity of 750 watts for five minutes without any prior thawing and without any water absorption napkins or other additions. This caused the pizza to reach a cooking temperature exceeding 212 degrees.

The resulting pizza was fully cooked and virtually indistinguishable from a fresh baked pizza made from the traditional pure flour. The pizza crust was remarkably palatable, without a tough center crust or soggy center. In fact, the resulting pizza was frozen and microwaved and then re-frozen and re-microwaved four times before the resulting pizza became significantly impalatable.

EXAMPLE 4

Crescent Rolls

A traditional recipe for a crescent roll is also set forth in the book "Light Style." The recipe is as follows:

1 envelope active dry yeast;
¼ cup warm water (105 to 115 degrees);
1 cup non-fat milk, heated slightly (about 115 degrees);
6 tablespoons egg substitute, or 2 eggs;
¾ cup plus 2 tablespoons low-calorie margarine, softened;
1½ tablespoons fructose;
about 4¼ cups unbleached flour;
½ teaspoon vegetable oil; and
2 additional tablespoons non-fat milk.

In a large mixing bowl, dissolve yeast in warm water. Let it stand 10 minutes. Mix in heated milk, 2 tablespoons of the egg substitute or 1 egg, 2 tablespoons of the margarine, and fructose. Add 2 cups of the flour and beat with an electric mixer at medium speed for 2 minutes, scraping sides of bowl occasionally (or beat by hand until well incorporated). Stir in 1½ cups of the remaining flour, or enough to make a soft dough. Turn dough out onto a well-floured surface and knead about 5 minutes, adding remaining flour as needed, or until dough is smooth and elastic. Form dough into a ball and place in a bowl lightly greased with the oil. Turn the dough ball to grease top side and cover bowl with a towel. Let rise in a warm place until doubled in bulk, about 2 hours.

Roll out the dough on a lightly floured surface into an 18×12 inch rectangle. Beginning at a long side, spread 4 tablespoons of the margarine over two-thirds of the dough. Fold the greased third of the dough over the center third. Fold the ungreased third on top. Rotate the dough a quarter turn. Repeat the complete procedure two more times (starting with rolling out dough into an 18×12 inch rectangle), using remaining margarine. (The dough will look stringy and watery, the layers will separate, and the water content of the margarine will be released, but keep rolling firmly.) Wrap dough in aluminum foil and refrigerate several hours or overnight.

In shaping rolls, divide dough into five equal portions. Working with one piece at a time and keeping other portions refrigerated, roll with each portion into a circle about 9 inches in diameter and about ¼ inch thick on a lightly floured board. Cut circle into 8 wedges and set up each wedge from the wide end to the tip end. Form the rolls into crescent shapes and place on ungreased baking sheets, tip side down. When all rolls have been shaped, let rise in a warm place until doubled in bulk, about 45 minutes to one hour. Combine the remaining 3 tablespoons egg substitute or 1 egg and 2 tablespoons milk and brush mixture on rolls. Bake at 400 degrees for about 20 minutes or until golden brown. Remove rolls from pans with spatula.

Each roll contains approximately:
55 calories
16 mg sodium
2 g fat
0 mg cholesterol
Exchanges: 1 bread When used to make this frozen microwaveable crescent roll, the flour-starch mixture of the present invention was again substituted as the flour component in the recipe pound for pound. The roll was then baked as set forth above and frozen. The frozen roll was then microwaved at the maximum intensity of 750 watts for 40 seconds without any prior thawing and without any water absorption napkins or other additions.

The resulting crescent roll was remarkably light and fluffy throughout, and it had excellent palatability. As with the pizza, the resulting roll was frozen and microwaved and then re-frozen and re-microwaved four to five times before the resulting pizza became significantly impalatable. In addition when frozen the resulting roll displayed less water or fluid crystallization than the traditional recipe without the improved mixture.

EXAMPLE 5

French Bread

A traditional recipe for a French Bread is also set forth in the book "Light Style." The recipe is as follows:

½ cup non-fat milk;
1 cup boiling water;
1 envelope active dry yeast;
¼ cup warm water (105 to 115 degrees);
1½ tablespoons low-calorie margarine;
1 tablespoon plus 2 teaspoons fructose;
4 cups sifted unbleached flour;
2 tablespoons cornmeal;
1 egg white, beaten; and
1 tablespoon cold water.

Hold the milk in a saucepan and add boiling water. Cool to luke warm (about 85 degrees). Meanwhile, dissolve yeast in warm water. Let stand ten minutes, then stir the margarine into the milk mixture. Combine fructose and flour in a mixing bowl. Make a well in the center and add solid mile-yeast mixture. Stir thoroughly, but do not knead; the dough will be soft. Form the dough into a ball, cover it, and let it rise in a warm dish, or until it doubles in bulk.

Punch down dough and divide into two portions. Form each portion into a long loaf on a floured board. Dust bottom of loaves with cornmeal. Place loaves on a greased baking sheet or one lined with parchment paper. Make several ¼ inch deep slits across tops of loaves. Let rise in a warm place until almost doubled in bulk. Place in oven over a pan of simmering water and bake at 400 degrees for 15 minutes. Reduce the heat to 350 degrees and bake for 30 minutes, or until golden and crisp. About five minutes before loaves are done, mix egg white with cold water and brush on loaves, then finish baking. This recipe makes two loaves having 16 slices each.

When used to make this frozen microwaveable bread, the flourstarch mixture was again substituted as the flour component in the recipe pound for pound. The bread was then baked as set forth above and frozen. The frozen roll was then microwaved at the maximum intensity of 750 watts for 1.5 minutes without any prior thawing and without any water absorption napkins or other additions.

The resulting bread was remarkably light and fluffy throughout, and it has excellent palatability. As with the pizza, the resulting bread was frozen and microwaved and then re-frozen and re-microwaved four to five times before the resulting pizza became significantly impalatable. In addition, when frozen the resulting bread displayed less water or fluid crystallization than the traditional recipe without the improved mixture.

What is claimed is:

1. A flour-starch mixture comprising in admixture from about 85% to about 35% by weight flour, from about 15% to about 60% by weight of high amylose starch, and from about 0.25% to about 5% by weight of high amylopectin starch.

2. The flour-starch mixture of claim 1 comprising from about 59% to about 47% by weight flour, from about 40% to about 50% by weight high amylose starch, and from about 1% to about 3% by weight high amylopectin starch.

3. The flour-starch mixture of claim 2 comprising about 45% by weight of high amylose starch.

4. The flour-starch mixture of claim 2 or 3 wherein said high amylose starch is a single starch.

5. The flour-starch mixture of claim 1 comprising from about 1% to about 3% by weight of high amylopectin starch.

6. The flour-starch mixture of claim 5 comprising about 2% by weight of high amylopectin starch.

7. The flour-starch mixture of claim 5 or 6 wherein said high amylopectin starch is a member of the group consisting of waxy maize starch, waxy corn starch, modified waxy maize starch, modified waxy corn starch, and a starch wherein over about 80% by weight of the starch is amylopectin.

8. A flour-starch based food product that is made with the flour-starch mixture of claim 1.

9. The flour-starch based food product of claim 8 in association with a microwave susceptor.

10. The flour-starch based food product of claim 8 wherein the product is a member of the group consisting of a croissant, a bread, and a bagel.

11. The flour-starch based food product of claim 9 wherein the product is a member of the group consisting of a waffle, a pancake, and a toast.

12. The flour-starch based food product of claim 9 wherein the product is a pizza crust.

13. The flour-based food product of claim 9 wherein said product is frozen.

14. A method for preparing a flour-starch mixture comprising:
combining in any order from about 85 to about 35 parts by weight flour, from about 15 to about 60 parts by weight high amylose starch, and from about 0.25 to about 5 parts by weight of high amylopectin starch to form a flour-starch mixture.

15. The method of claim 14 comprising from about 59 to about 47 parts by weight flour, from about 40 to about 50 parts by weight high amylose starch, and from about 1 to about 3 parts by weight high amylopectin starch.

16. The method of claim 15 comprising about 45% by weight of said high amylose starch.

17. The method of claim 15 wherein said high amylose starch is a single starch.

18. The method of claim 15 wherein said high amylopectin starch is a single starch.

19. The method of claim 18 comprising about 2% by weight of said high amylopectin starch.

20. The method of claim 18 wherein said high amylopectin starch is a member of the group consisting of waxy maize starch, waxy corn starch, modified waxy maize starch, modified waxy corn starch, and a starch having over 80% by weight amylopectin.

21. A method for preparing a flour-starch based food product comprising the steps of:
(a) converting a flour-starch mixture into a dough, said flour-starch mixture comprising from about 85% to about 35% by weight flour, from about 15% to about 60% by weight of a high amylose starch, and from about 0.25% to about 5% by weight of a high amylopectin starch; and
(b) cooking said dough to form said flour-starch based food product.

22. The method of claim 21 further comprising the step:
(c) freezing said flour-starch based food product to form a frozen flour-starch based food product that is capable of heating substantially evenly when subjected to microwave energy.

23. The method of claim 22 further comprising the step of:
(d) associating said frozen flourstarch based food product with a microwave susceptor.

24. The method of claim 21 wherein said flour-starch mixture of Step (a) comprises from about 59% to about 47% by weight of said flour, from about 40% to about 50% by weight of said high amylose starch, and from about 1% to about 3% by weight of said high amylopectin starch.

25. The method of claim 24 wherein said high amylopectin starch is a member of the group consisting of waxy maize starch, waxy corn starch, modified waxy maize starch, modified waxy corn starch, and a single starch having over about 80% by weight amylopectin.

26. The method of claim 21 wherein the ratio of said amylose to said amylopectin in the flour-starch mixture is from about 0.58:1 to about 0.9:1.

27. A flour-starch mixture comprising from about 85% to about 35% by weight flour and from about 15% to about 65% by weight starch wherein the ratio of amylose to amylopectin in said starch is from about 0.58:1 to about 0.9:1.

28. The flour-starch mixture of claim 27 wherein said starch is derived from a single species.

29. The flour-starch mixture of claim 28 wherein said starch is derived from a single genetically modified species.

* * * * *